United States Patent [19]
Saito et al.

[11] Patent Number: 5,592,336
[45] Date of Patent: Jan. 7, 1997

[54] REFLECTOR SUPPORTING MECHANISM

[75] Inventors: Hideo Saito; Noboru Itoh, both of Hyogo, Japan

[73] Assignee: Mitsubishi Denki Kabushiki Kaisha, Tokyo, Japan

[21] Appl. No.: 504,137

[22] Filed: Jul. 19, 1995

[30]  Foreign Application Priority Data

Dec. 20, 1994  [JP]  Japan .................................. 6-316681

[51]  Int. Cl.$^6$ ............................................ G02B 7/18
[52]  U.S. Cl. ........................ 359/871; 359/872; 359/849; 343/884
[58]  Field of Search ................................ 359/871, 872, 359/849, 846; 248/288.31; 343/878, 882, 912, 880

[56]  References Cited

U.S. PATENT DOCUMENTS

| | | | |
|---|---|---|---|
| 4,500,170 | 2/1985 | Montesanto | 359/849 |
| 4,601,723 | 7/1986 | McGrew | 623/10 |
| 4,845,510 | 7/1989 | Chang et al. | 343/880 |
| 5,035,497 | 7/1991 | Itoh | 359/849 |
| 5,115,351 | 5/1992 | Miyawaki et al. | 359/849 |

OTHER PUBLICATIONS

Astronomy Monthly, "Active Optics of JNLT", Dec. 1989, pp. 308–313.

Primary Examiner—Timothy P. Callahan
Assistant Examiner—Dinh T. Le
Attorney, Agent, or Firm—Rothwell, Figg, Ernst & Kurz

[57]   ABSTRACT

The present invention is intended to obtain a reflector supporting mechanism capable of preventing axial deviation of a sleeve of a reflector side and a socket of a supporting mechanism side and facilitating remounting of the reflector supporting mechanism from/onto the reflector. The reflector supporting mechanism according to the present invention comprises a cylindrical sleeve, a socket which is provided with a flange and crowned at its tapered side part and adapted to come in contact with the sleeve by a side contact point and a flange part, and a universal joint provided on the socket.

10 Claims, 9 Drawing Sheets

REFLECTOR SUPPORTING MECHANISM

FIELD OF THE INVENTION

The present invention relates to a reflector supporting mechanism for supporting a large-sized reflector such as a telescope and a parabola antenna.

BACKGROUND OF THE INVENTION

Figure 7:
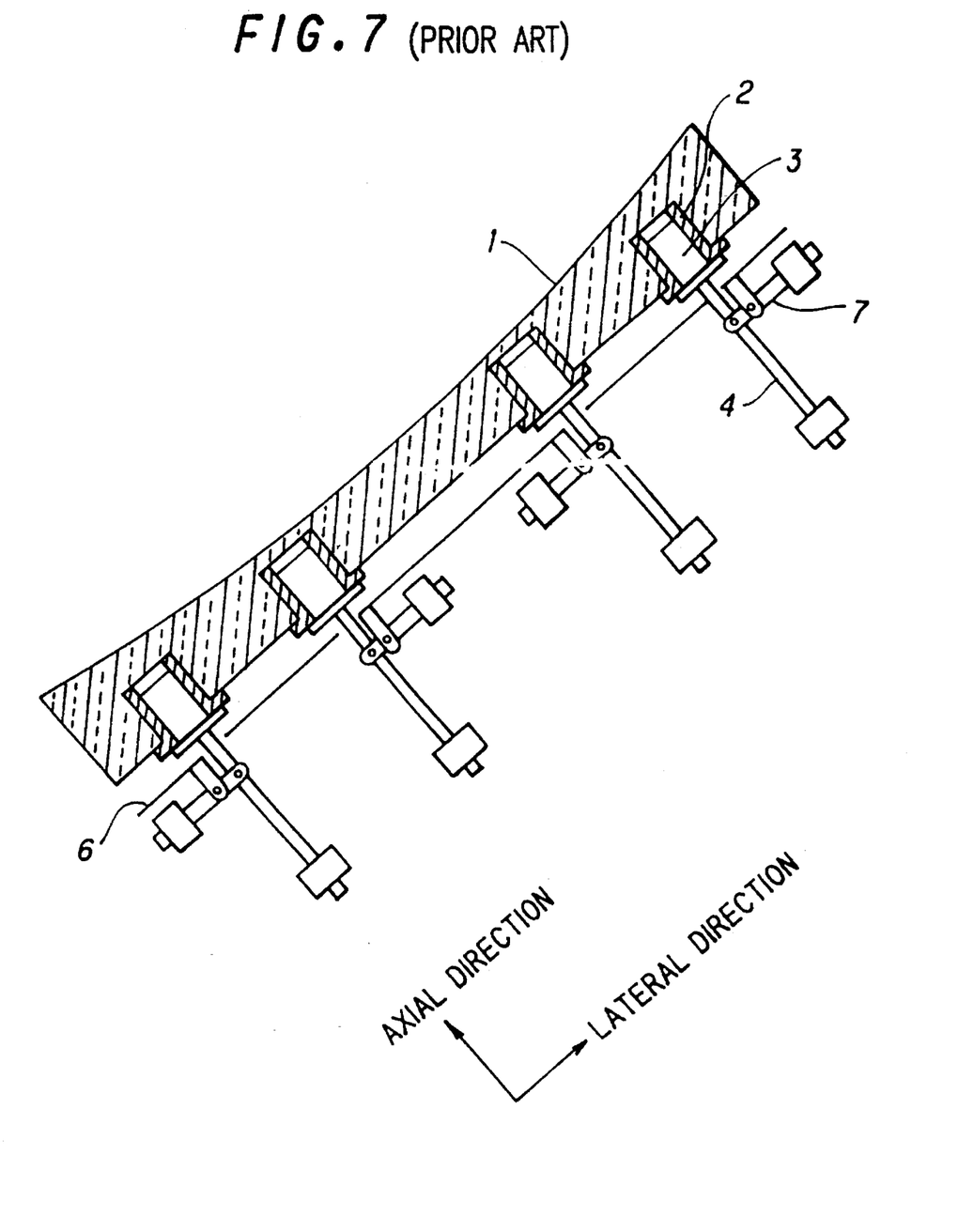
FIG. 7 is a sectional view of a conventional reflector supporting mechanism.
Figure 8:
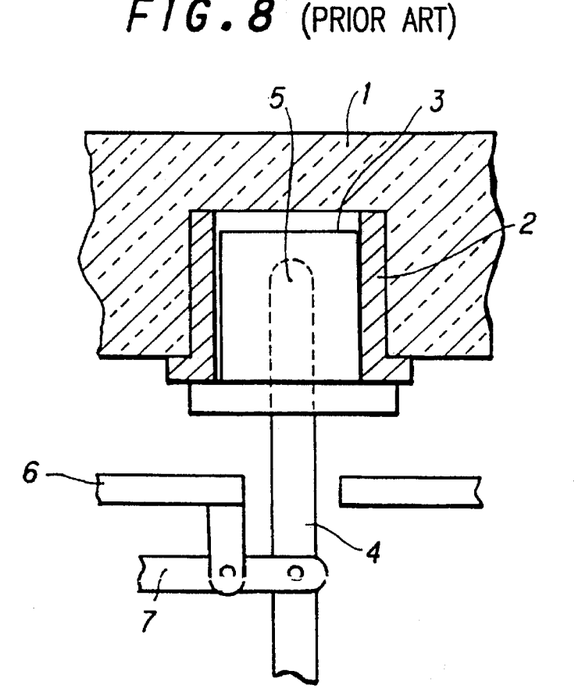
FIG. 8 is a partial sectional view of a conventional reflector supporting mechanism.

FIG. 7 shows a reflector supporting mechanism which has been used and FIG. 8 is an extended view of a supporting mechanism part thereof.

In these diagrams, reference numeral 1 denotes a reflector, 2 is a cylindrical sleeve, 3 is a cylindrical socket, 4 is a lateral support lever for supporting in a lateral direction, 5 is a universal joint (fulcrum), 6 is a mirror cell for supporting the reflector, and 7 is an axial support lever for supporting in an axial direction.

Operation is described below. When a telescope is operated, a position of a reflector 1 is changed from a position facing the zenith to a position facing horizontal direction. The reflector 1 can be held by a supporting force of a supporting mechanism which acts in an axial direction and a lateral direction. Since an aluminum deposited on the reflection surface of the reflector 1 deteriorates along with lapse of time, the reflector 1 is removed from the telescope and the reflection surface is re-deposited several times a year. Therefore, a supporting mechanism which can be easily removed from the reflector is required and the supporting mechanism therefor is constructed so that a socket of the supporting mechanism is inserted into a sleeve 2 of the reflector.

Another conventional example is a supporting mechanism for a reflector which actively maintains an accuracy of a mirror surface by carrying out compensation in accordance with a result of measurement of deformation of a large-sized telescope.

Figure 9:
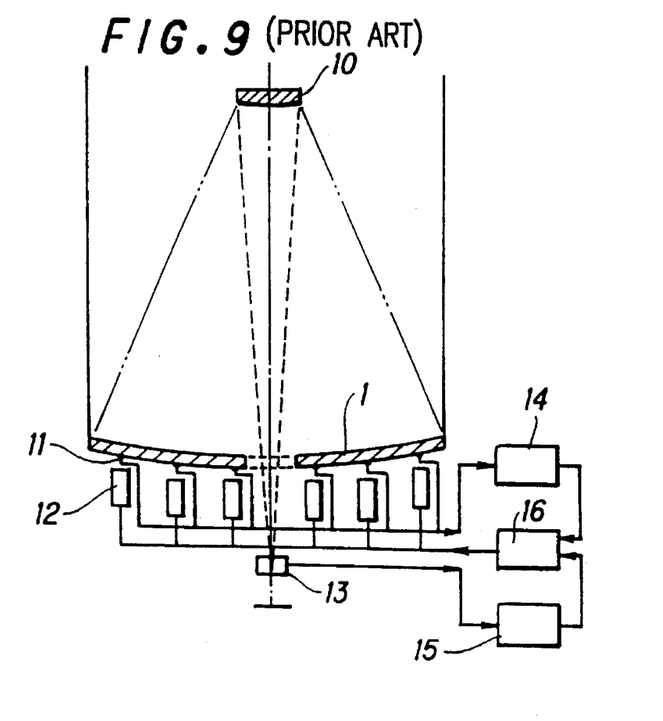
FIG. 9 is a sectional view of a conventional reflector supporting mechanism.
Figure 10:
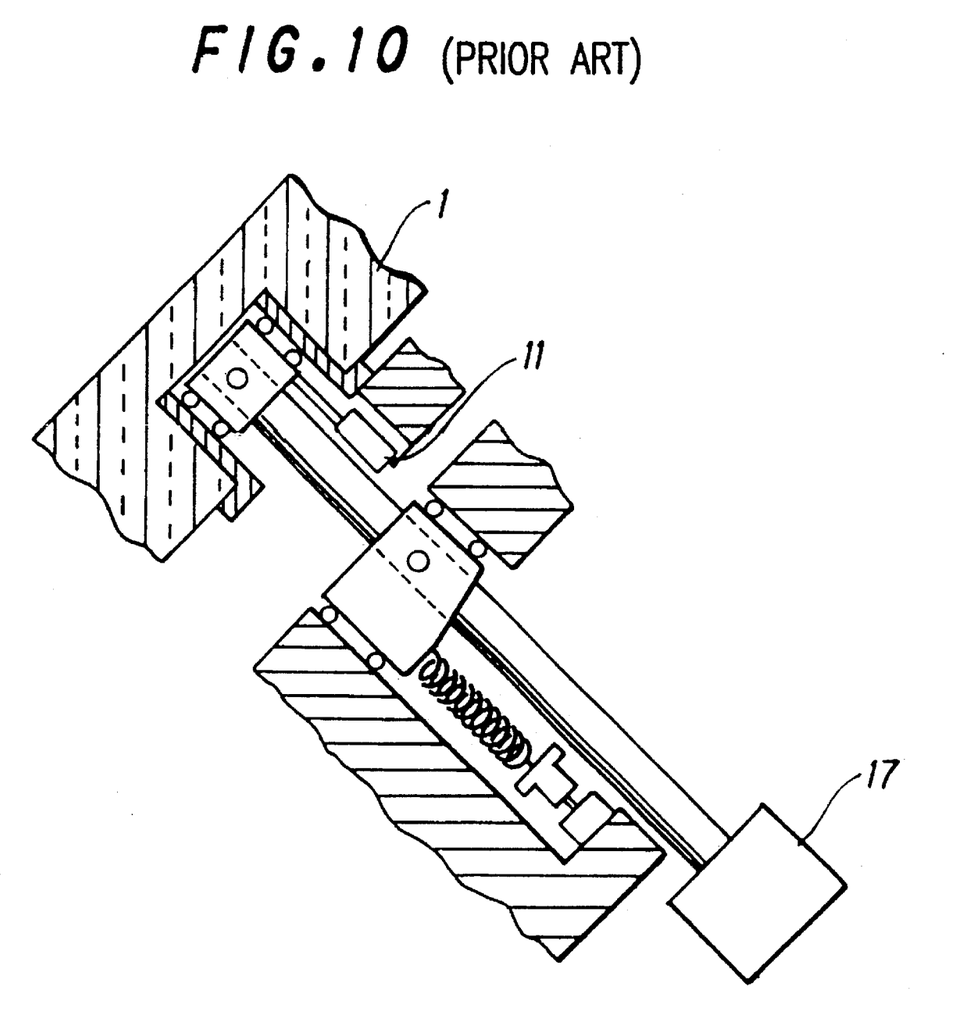
FIG. 10 is a partial sectional view of a conventional reflector supporting mechanism.

FIGS. 9 and 10 show an actuator system related to a conventional large-sized infrared telescope (JNLT) disclosed in Astronomy Monthly "Active Optics of JNLT", December 1989 (Ie and Yamashita), wherein 1 is a reflector, 10 is a sub reflector, 11 is a supporting force detector, 12 is an actuator, and 13 is a mirror surface inspection unit. FIG. 10 shows an extended sectional view of the actuator 10 wherein 17 is a balance weight.

The following describes operation thereof. The large-sized reflector 1 (diameter: approximately 8 m) is supported by a number of actuators 12 (approximately 300 actuators) and the shape of the mirror surface is maintained in a high accuracy (approximately 0.1 μm) by carrying out supporting force analysis/calculation of mirror surface errors in 14 according to an output from the supporting force detectors 11 built in respective actuators 12 and image analysis/calculation of mirror surface errors in 15 according to the output from the mirror surface detection unit and the supporting force is compensated in 16 and therefore high precision actuators are required.

Though an ideal supporting mechanism of the reflector is such that the axis of the socket 3 is positioned in the same direction as the axial direction of the reflector 1, the conventional supporting mechanism includes a problem that the axis deviates when the position of the reflector 1 is changed.

This axial deviation is described below referring to FIGS. 11A to 11F and FIG. 12.

Figure 11A:
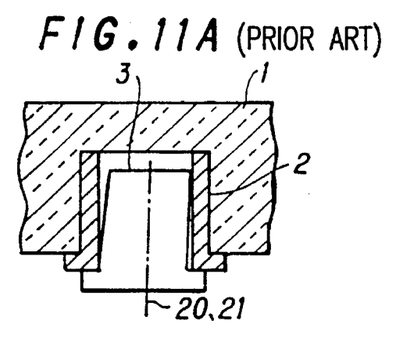
FIGS. 11A to 11F are diagrams illustrating operation of the conventional reflector supporting mechanism.
Figure 11B:
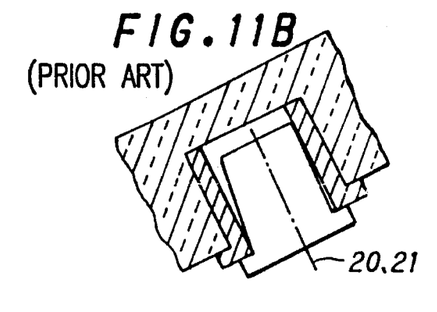
Figure 11C:
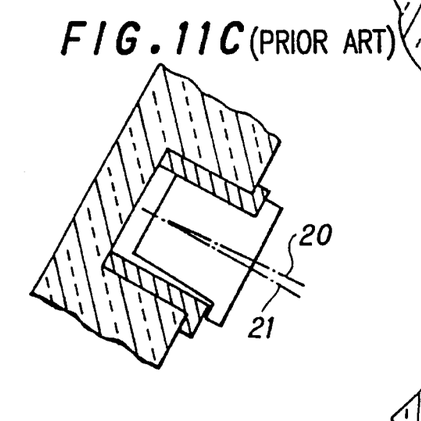
Figure 11D:
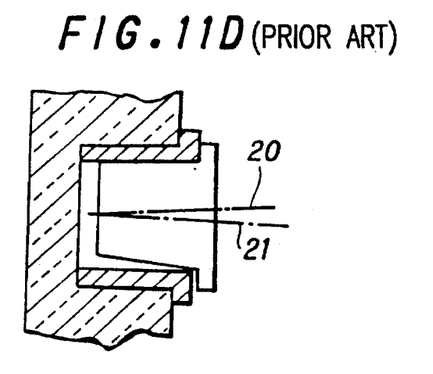
Figure 11E:
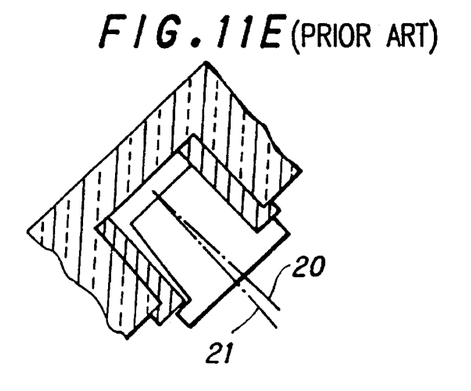
Figure 11F:
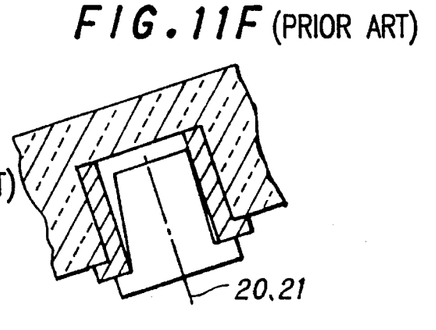

FIG. 11A shows the reflector 1 faced to the zenith, FIG. 11D shows the reflector 1 faced to the horizontal direction, FIGS. 11B and 11C respectively show the position of the reflector 1 whose angle of elevation is changed from the zenith to the horizontal direction, an FIGS. 11E and 11F respectively show the position of the reflector 1 whose angle of elevation is returned from the horizontal direction to the zenith. 20 denotes an axis of the socket 3 and 21 denotes the axial direction of the reflector 1 (axial direction of the mirror).

Figure 12:
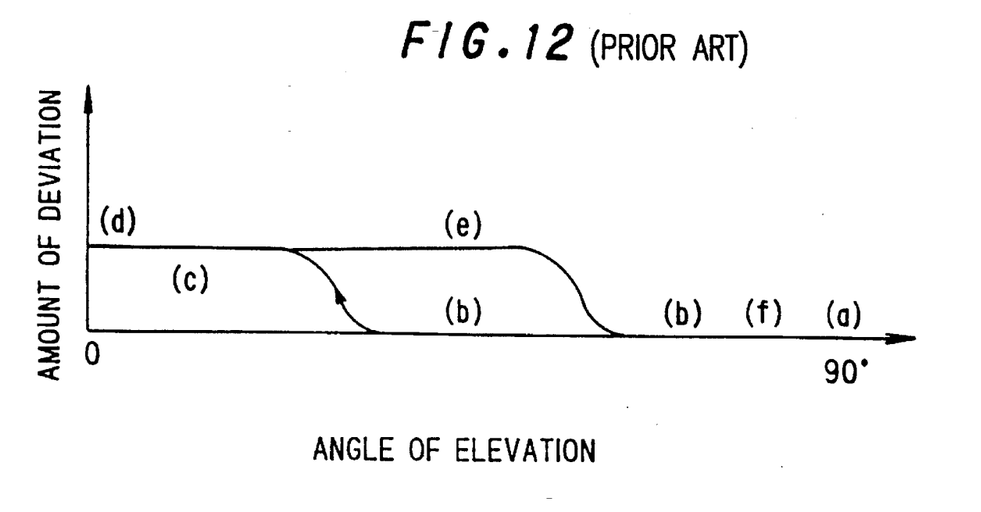
FIG. 12 is a characteristics diagram showing the characteristics of operation of the conventional reflector supporting mechanism.

As shown in the drawing, the axis 20 of the socket 3 is deviated from the axial direction 21 of the reflector 1 due to a change of the angle of elevation of the reflector 1. This deviation is shown in FIG. 12. FIG. 12, (a) to (f) respectively show a status corresponding to the status shown in FIGS. 11A to 11F. Specifically, the amount of deviation increases along with the change of the angle of elevation of the reflector I from the position where the reflector 1 is faced to the zenith as shown in (a) to the position where the reflector 1 is kept in the horizontal direction and the amount of deviation from the status of the reflector faced in the horizontal direction shown in (d) to the status of the reflector faced to the zenith shown in (a) differs from that from the status shown in (a) to the status shown in (d).

The conventional supporting mechanism comprises a sleeve 2 provided with a cylindrical hole and a socket 3 provided with a flange. Though it is ideal that the sleeve 2 and the socket 3 contact each other at the flange and the cylindrical side surface, there is provided a clearance between the sleeve 2 and the socket 3 for remounting the reflector 1 and the axial deviation of the reflector 1 is caused by the change of the relative positions of the sleeve 2 and the socket 3 resulting from the change of attitude of the reflector 1 since there are errors in the dimensions and shapes of parts of the sleeve 2 and the socket 3 which come in contact. The amount of deviation when the angle of elevation increases differs from that when the angle decreases, due to a friction between the sleeve 2 and the flange of the socket 3. Accordingly, there has been a problem that the supporting point positions are deviated or a difference of the supporting force is caused. It has been very difficult to insert the cylindrical socket into the cylindrical sleeve and therefore there has been an inconvenience in remounting the supporting mechanism.

SUMMARY OF THE INVENTION

An object of the present invention made to solve the above problems is intended to prevent axial deviation of the socket and the sleeve and improve the shapes of the sleeve and the socket so that the sleeve and the socket can be easily remounted.

A reflector supporting mechanism according to the present invention comprises a sleeve fitted into a hole provided on a rear surface of a reflector, a socket remountably inserted into the sleeve, a universal joint provided in the socket, and a support lever rotatably coupled with the universal joint whereby one of an internal surface part and the external surface of a socket opposing to this internal surface part is formed as an outwardly curved surface with a curve along an axial direction thereof as a crest line and the other internal surface part is formed as a curved surface with a line along the axial direction as the crest line to make the internal surface part of the sleeve and the external surface part of the socket come in point contact.

Otherwise, the internal surface part of the sleeve is formed as a cylindrical external peripheral side surface and the side surface part of the socket is formed to be drum-shaped so that its central part along the axial direction is outwardly curved.

Otherwise, the internal surface part of the sleeve is formed to be outwardly curved at its central part along the axial direction and the external surface part of the socket is formed to have a cylindrical external peripheral side surface.

Otherwise, the internal surface part of the sleeve is formed as an external cylindrical peripheral surface which is tapered so that an outside diameter of one end of the obverse surface of the reflector is smaller than the outside diameter of the other end thereof, and the external side surface part of the socket is formed to have a convex profile with an outside diameter which is larger from one end of the obverse surface of the reflector toward the other end along the axial direction.

Otherwise, the internal side surface part of the sleeve is convex-shaped with a diameter which is larger from one end of the obverse surface of the reflector toward the other end thereof along the axial direction and the external side surface part of the socket is formed as an external peripheral side which is tapered so that the outside diameter of one end of the obverse surface of the reflector is smaller than the outside diameter of the other end thereof.

Otherwise, the positions of the internal surface of the sleeve and the external surface of the socket, which come in point contact, are determined so that a rotation moment to be applied to the universal joint is balanced.

In the reflector supporting mechanism according to the present invention, one of the internal side surface part of the sleeve fitted in a hole provided on the rear surface of the reflector and the external side surface part of the socket opposing to the internal side surface part is formed as a convex profile with a crest line along the axial direction and the other side surface part is formed as a curve with a crest line along the axial direction whereby the internal side surface part of the sleeve and the external side surface part of the socket come in point contact.

Otherwise, the internal side surface part of the sleeve is formed as a cylindrical external peripheral side surface and the side surface part of the socket is drum-shaped to be convexed at its central part along the axial direction whereby the internal side surface part of the sleeve and the external side surface part of the socket come in point contact.

Otherwise, the internal side surface part of the sleeve is formed to be convexed at its central part along the axial direction and the external side surface part of the socket is formed as a cylindrical external peripheral side surface whereby the internal side surface part of the sleeve and the external side surface part of the socket come in point contact.

Otherwise, the internal surface part of the sleeve is formed as an external cylindrical peripheral surface which is tapered so that an outside diameter of one end of the obverse surface of the reflector is smaller than the outside diameter of the other end thereof, and the external side surface part of the socket is formed to have a convex profile with an outside diameter which is larger from one end of the obverse surface of the reflector toward the other end along the axial direction. Otherwise, the internal side surface part of the sleeve is convex-shaped with a diameter which is larger from one end of the obverse surface of the reflector toward the other end thereof along the axial direction and the external side surface part of the socket is formed as an external peripheral side which is tapered so that the outside diameter of one end of the obverse surface of the reflector is smaller than the outside diameter of the other end thereof whereby the internal side surface part of the sleeve and the external side surface part of the socket come in point contact.

Otherwise, the positions of the internal surface of the sleeve and the external surface of the socket, which come in point contact, are determined so that a rotation moment to be applied to the universal joint is balanced whereby the internal side surface part of the sleeve and the external side surface part of the socket come in point contact.

Other objects and features of this invention will become understood from the following description with reference to the accompanying drawings.

DETAILED DESCRIPTION OF THE PREFERRED EMBODIMENTS

Figure 1:
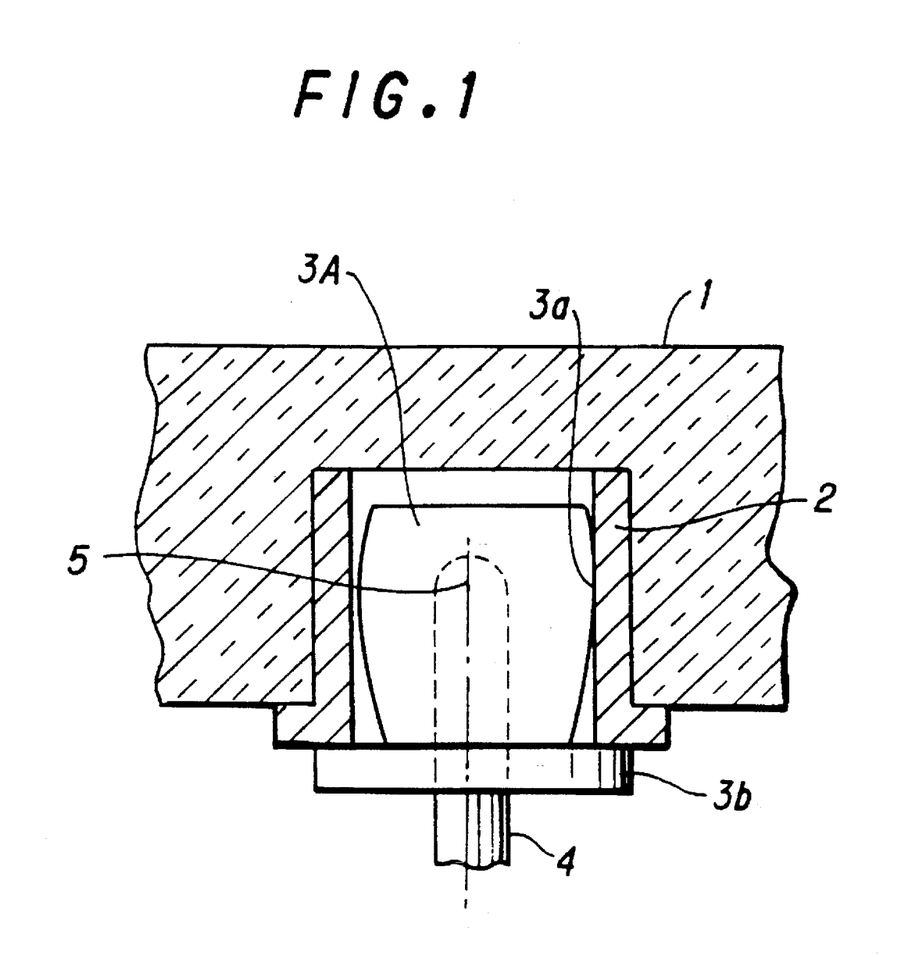
FIG. 1 is a sectional view showing a reflector supporting mechanism according to the embodiment 1 of the present invention.

An embodiment according to the present invention is described below, referring to the accompanying drawings. FIG. 1 is a sectional view showing a reflector supporting mechanism of an embodiment according to the present invention.

In FIG. 1, reference numeral 1 is a reflector, 2 is a cylindrical sleeve fitted in a hole provided in the reflector 1, 3A is a substantially cylindrical socket which is inserted into the sleeve 2 and crowned at its side, and 4 is a lateral supporting lever for supporting the socket through a support 5 provided on the socket.

The following describes the operation thereof referring to FIGS. 2A to 2D.

Figure 2A:
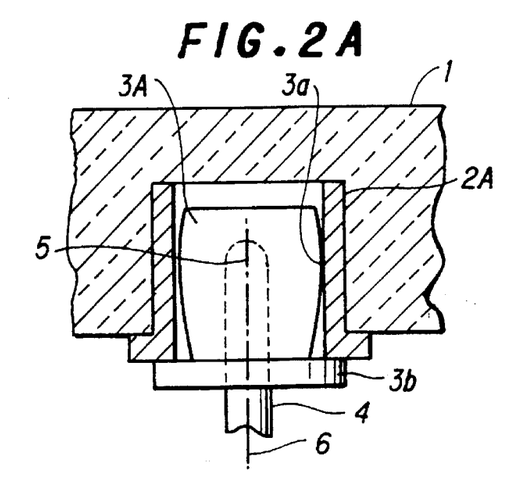
FIGS. 2A to 2D are diagrams illustrating operation of the embodiment 1 of the present invention.
Figure 2B:
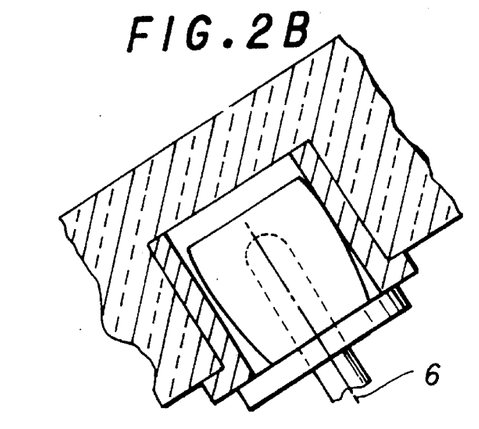
Figure 2C:
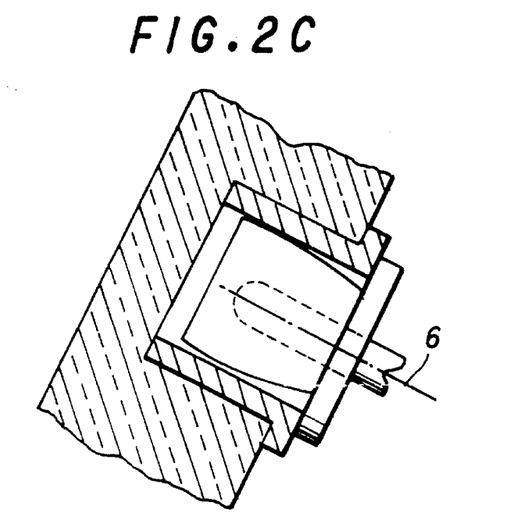
Figure 2D:
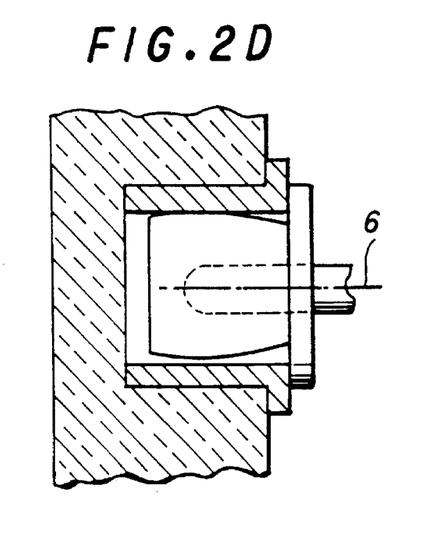

FIG. 2A shows the reflector 1 directed to the zenith, FIG. 2D shows the reflector 1 directed to the horizontal direction, and FIGS. 2B and 2C respectively show the reflector 1 held at an intermediate position until it is directed to the horizontal direction along with changing of the angle of elevation from the zenith. The same reference numerals show the same components and 6 is an axis of the socket 3A.

The socket 3A which is crowned at its side come in contact with the cylindrical sleeve 2 with one point of a contact part 3a and a flange 3b of the socket. Accordingly, even though the attitude of the reflector is changed from a position facing the zenith to a position facing the horizontal direction, the contact parts of the sleeve 2 and the socket 3A do not excessively change as shown in FIGS. 11A to 11F showing a conventional example, and the sleeve 2 and the socket 3A come in contact at the contact point 3a and the flange 3b of the socket 3A. Therefore, even though there is a difference in the profiles of the sleeve 2 and the socket 3A, axial deviation of the sleeve 2 and the socket 3A can be controlled and, even if the position of the reflector 1 shown in FIG. 2A is changed to the position shown in FIG. 2D or from FIG. 2D to FIG. 2A, the axis 6 of the socket 3A almost coincides with the axial direction of the reflector.

The socket 3A is crowned at its side to facilitate remounting.

As described above, the axial deviation of the sleeve and the socket can be prevented against a change of the attitude of the reflector and remounting of the reflector can be facilitated.

Figure 3:
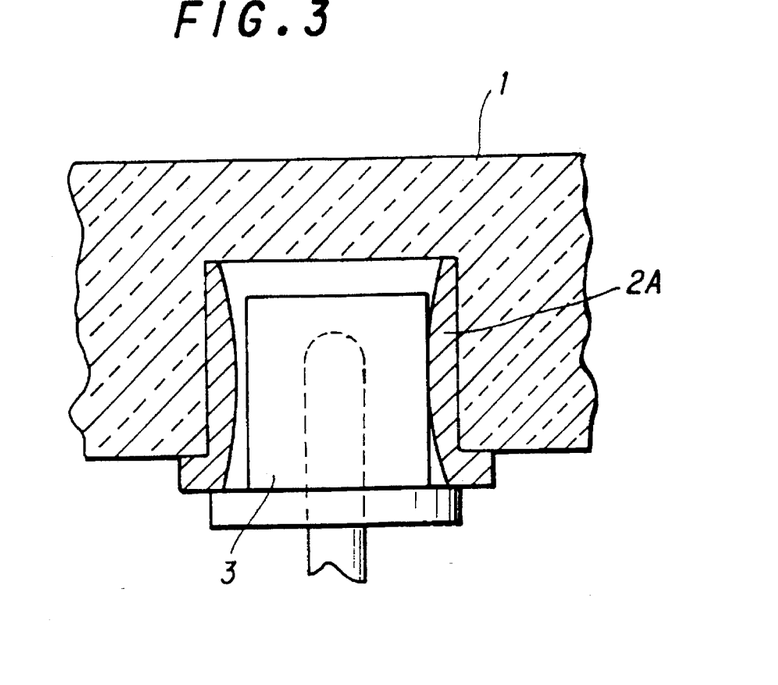
FIG. 3 is a sectional view showing a reflector supporting mechanism according to the embodiment 2 of the present invention.

In the embodiment 1, the external side surface of the socket 3A is crowned and the internal side surface of the sleeve 2 is formed to be cylindrical, while, on the contrary, in this embodiment, the internal side surface of the sleeve 2 is crowned and the external side surface of the socket 3 is formed to be cylindrical. As shown in FIG. 3, 2A is a crowned sleeve and 3 is a socket the side surface of which is formed to be cylindrical to provide the similar operation and effects as in the embodiment 1.

Figure 4:
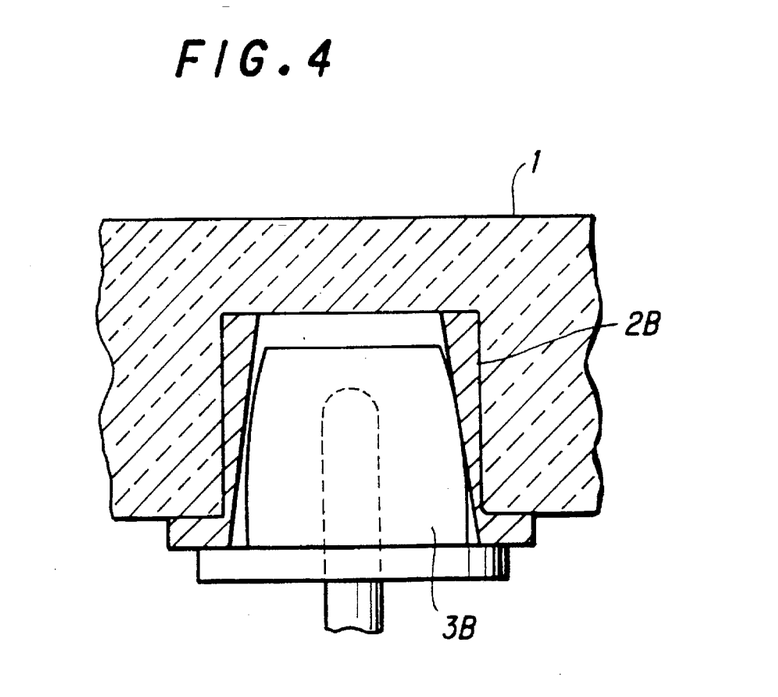
FIG. 4 is a sectional view showing a reflector supporting mechanism according to the embodiment 3 of the present invention.

FIG. 4 is a sectional view showing a reflector supporting mechanism according to another embodiment of the present invention.

In this embodiment, the internal side surface of the sleeve and the external side surface of the socket are basically tapered and 2B is a sleeve having a tapered internal side surface and 3B is a socket having an external side surface which is tapered and crowned, whereby the same operation and effect as in the embodiment 1 are obtained and remounting of the sleeve and the socket can be easily carried out since the internal side surface of the sleeve and the external side surface of the socket are tapered, thereby enabling to further facilitate mounting and demounting of the supporting mechanism from the reflector.

Figure 5:
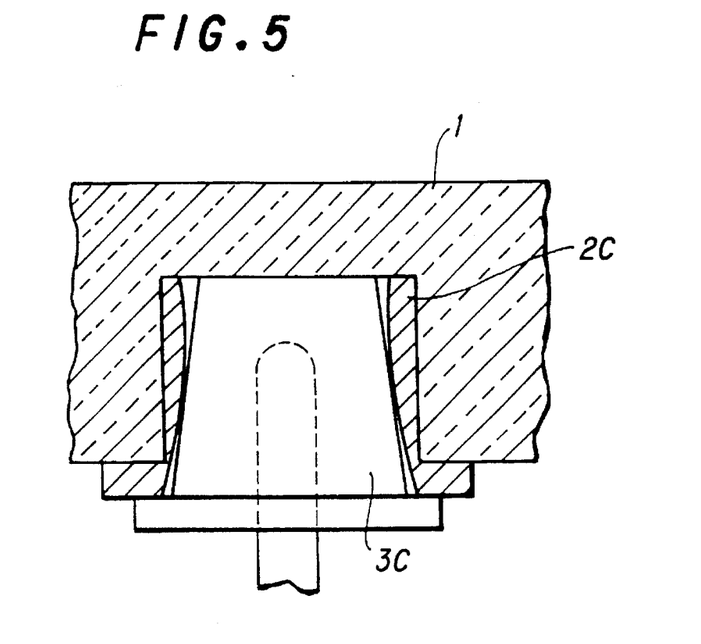
FIG. 5 is a sectional view showing a reflector supporting mechanism according to the embodiment 4 of the present invention.

FIG. 5 is a sectional view showing the reflector supporting mechanism which is another embodiment of the present invention.

2C is a socket whose internal side surface is tapered and crowned and 3C is a socket whose external side surface is tapered whereby the same operation and effect as in the embodiment 3 are obtained.

Figure 6:
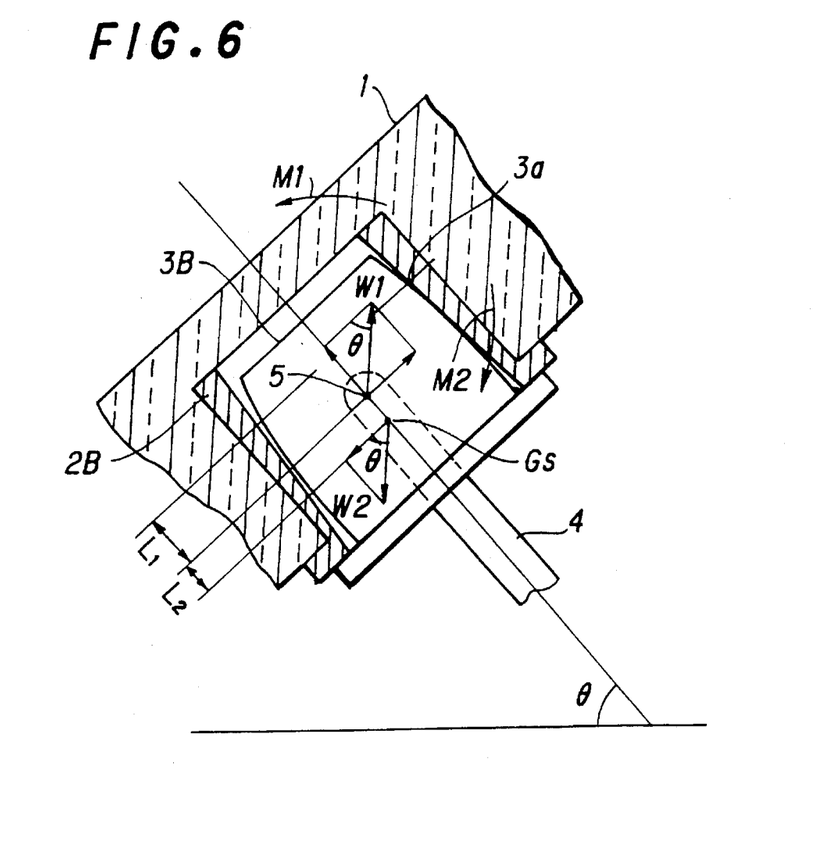
FIG. 6 is a diagram illustrating a reflector supporting mechanism according to the embodiment 5 of the present invention and the operation thereof.

This embodiment is intended to optimize the contact point of the sleeve and the socket and described according to FIG. 6.

FIG. 6 shows a similar construction to the embodiment 3 wherein 2B is a tapered sleeve and 3B is a socket which is tapered and crowned, simultaneously showing the principle of operation.

In FIG. 6, W1 is the weight of the reflector, W2 is the weight of socket 3B, 5 is the universal joint (fulcrum), 3a is a side contact point of the socket 3B, $G_S$ is the center of gravity of the socket 3B and θ is the angle of elevation of the reflector.

Moment $M_1$ with respect to the universal joint (fulcrum) 5 and moment $M_2$ with respect to the center of gravity of the socket when the reflector is rotated from the attitude facing the zenith to the attitude in the horizontal direction and the angle of elevation becomes θ, are obtained.

Assuming that a distance in the axial direction between the side contact point 3a and the universal joint 5 is $L_1$ and a distance in the axial direction between the universal joint 5 and the center of gravity $G_S$ of the socket 3B is $L_2$, the following equation is given.

$M_1 = L_1 \, \theta \, W1 \cos \theta$ $M_2 = (L_1 + L_2) \, W2 \cos \theta$

For $M_1 = M_2$,
$L_1 W1 = (L_1 + L_1) \cdot W2$ is required and
$L_1 = L_2 \theta W2/(W1 - W2)$ is obtained.

As described above, the rotation moment of the socket 3B around the support point can be reduced by selecting $L_1$ to obtain $M_1 = M_2$ The contact point of the sleeve and the socket is optimized as described above and therefore the axial deviation of the sleeve and the socket can be further reduced.

As described above, the reflector supporting mechanism according to the present invention comprises the sleeve fitted in the hole provided on the rear surface of the reflector, the socket remountably inserted into the sleeve, the universal joint provided on the socket, and the supporting lever rotatably coupled to the universal joint, wherein one of the internal side surface part of the sleeve and the external side surface part of the socket opposing to this internal side surface part is formed as a convex profile with the curve along the axial direction as the crest line and the other of these side surface parts is formed as a curved profile with a straight line along the axial direction as the crest line, whereby the internal side surface part of the sleeve and the external side surface of the socket come in point contact and therefore the axial deviation of the sleeve and the socket due to the change of the attitude of the reflector can be prevented and remounting of the reflector supporting mechanism can be facilitated.

Otherwise, the internal side surface part of the sleeve is formed as a cylindrical external peripheral side surface and the external side surface part of the socket is drum-shaped so that its central part is convexed along the axial direction and therefore the axial deviation of the sleeve and the socket due to the change of the attitude of the reflector can be prevented and remounting of the reflector supporting mechanism can be facilitated.

Otherwise, the internal side surface part of the sleeve is formed so that its central part is convexed along the axial direction and the external side surface part of the socket is formed as a cylindrical external peripheral side surface and therefore the axial deviation of the sleeve and the socket due to the change of the attitude of the reflector can be prevented and remounting of the reflector supporting mechanism can be facilitated.

Otherwise, the internal side surface part of the sleeve is formed as a cylindrical external periphery which is tapered so that the outside diameter of one end of the obverse surface of the reflector is smaller than the outside diameter of the other end and the external side surface part of the socket is formed as a convex profile with the outside diameter which becomes larger from one end of the obverse surface of the reflector toward the other end along the axial direction and therefore the axial deviation of the sleeve and the socket due to the change of the attitude of the reflector can be prevented and remounting of the reflector supporting mechanism can be facilitated.

Otherwise, the internal side surface part of the sleeve is formed as a convex profile with the outside diameter which becomes larger from one end of the obverse surface of the reflector toward the other end along the axial direction and the external side surface part of the socket is formed as a cylindrical external periphery which is tapered so that the outside diameter of one end of the obverse surface of the reflector is smaller than the outside diameter of the other end and therefore the axial deviation of the sleeve and the socket due to the change of the attitude of the reflector can be prevented and remounting of the reflector supporting mechanism can be facilitated.

Otherwise, the positions of the internal surface of the sleeve and the external surface of the socket, which come in point contact, are determined so that a rotation moment to be applied to the universal joint of the socket is balanced whereby the axial deviation of the sleeve and the socket can be further reduced and remounting of the reflector supporting mechanism can be facilitated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A reflector supporting mechanism comprising:
   a sleeve fitted in a hole provided on a rear surface of a reflector;
   a cylindrical socket remountably inserted into said sleeve, said cylindrical socket having a flange formed thereon for contacting said sleeve to provide a supporting force for said reflector in an axial direction of said socket;
   a universal joint provided in said socket; and
   a supporting lever rotatably coupled to said universal joint,
   wherein one of an internal side surface part of said sleeve and an external side surface part of said socket opposing to said internal side surface part is formed as a convex profile with a curve along the axial direction as a crest line and the other of these side surface parts is formed as a curved profile with a straight line along the axial direction as a crest line, whereby the internal side surface part of said sleeve and the external side surface of said socket come in only point contact to provide a supporting force for said reflector in a lateral direction of said socket.

2. A reflector supporting mechanism according to claim 1, wherein the positions of the internal surface of said sleeve and said external surface of the socket, which come in said point contact, are determined so that a rotation moment to be applied to the universal joint of said socket is balanced.

3. A reflector supporting mechanism according to claim 1, wherein the internal side surface part of said sleeve is formed as a cylindrical external peripheral side surface and the side surface part of said socket is drum shaped so that its central part is convexed along the axial direction.

4. A reflector supporting mechanism according to claim 3, wherein the positions of the internal surface of said sleeve and said external surface of the socket, which come in said point contact, are determined so that a rotation moment to be applied to the universal joint of said socket is balanced.

5. A reflector supporting mechanism according to claim 1, wherein the internal side surface part of said sleeve is formed to be convexed at its central part and the external side surface part of said socket is formed as a cylindrical external peripheral side surface.

6. A reflector supporting mechanism according to claim 5, wherein the positions of the internal surface of said sleeve and said external surface of the socket, which come in said point contact, are determined so that a rotation moment to be applied to the universal joint of said socket is balanced.

7. A reflector supporting mechanism according to claim 1, wherein the internal side surface part of said sleeve is formed as a cylindrical external periphery which is tapered so that an outside diameter of one end of an obverse surface of the reflector is smaller than the outside diameter of the other end and the external side surface part of said socket is formed as a convex profile with an outside diameter which becomes larger from one end of the obverse surface of the reflector toward the other end along the axial direction.

8. A reflector supporting mechanism according to claim 7, wherein the positions of the internal surface of said sleeve and said external surface of the socket, which come in said point contact, are determined so that a rotation moment to be applied to the universal joint of said socket is balanced.

9. A reflector supporting mechanism according to claim 1, wherein the internal side surface part of said sleeve is formed as a convex profile with an outside diameter which becomes larger from one end of the obverse surface of the reflector toward the other end along the axial direction and the external side surface part of said socket is formed as a cylindrical external periphery which is tapered so that an outside diameter of one end of the obverse surface of the reflector is smaller than the outside diameter of the other end.

10. A reflector supporting mechanism according to claim 9, wherein the positions of the internal surface of said sleeve and said external surface of the socket, which come in said point contact, are determined so that a rotation moment to be applied to the universal joint of said socket is balanced.

* * * * *